US007859964B2

(12) United States Patent
Jung

(10) Patent No.: US 7,859,964 B2
(45) Date of Patent: Dec. 28, 2010

(54) METHOD AND APPARATUS OF ADJUSTING FOCUSING SERVO IN OPTICAL DISC DEVICE

(75) Inventor: In Su Jung, Osan-si (KR)

(73) Assignee: LG Electronics Inc., Seoul (KR)

( * ) Notice: Subject to any disclaimer, the term of this patent is extended or adjusted under 35 U.S.C. 154(b) by 492 days.

(21) Appl. No.: 11/727,187

(22) Filed: Mar. 23, 2007

(65) Prior Publication Data
US 2008/0013417 A1 Jan. 17, 2008

(30) Foreign Application Priority Data
Mar. 23, 2006 (KR) .................... 10-2006-0026334

(51) Int. Cl.
*G11B 15/52* (2006.01)
(52) U.S. Cl. ............... 369/47.53; 369/53.23; 369/53.28
(58) Field of Classification Search ........................ None
See application file for complete search history.

(56) References Cited

U.S. PATENT DOCUMENTS

| 5,787,058 | A | 7/1998 | Choi | |
|---|---|---|---|---|
| 7,715,286 | B2* | 5/2010 | Miyake et al. | 369/44.23 |
| 2003/0086350 | A1* | 5/2003 | Kurashina et al. | 369/59.25 |
| 2004/0145978 | A1* | 7/2004 | Yamamoto | 369/44.32 |
| 2004/0196766 | A1* | 10/2004 | Tadano | 369/53.23 |
| 2005/0180276 | A1* | 8/2005 | Watanabe et al. | 369/44.29 |
| 2006/0104183 | A1* | 5/2006 | Kataoka et al. | 369/112.01 |
| 2006/0233070 | A1* | 10/2006 | Kurokawa et al. | 369/44.23 |
| 2007/0058501 | A1* | 3/2007 | Kurokawa et al. | 369/44.23 |
| 2007/0064552 | A1* | 3/2007 | Kurokawa et al. | 369/44.23 |
| 2009/0129217 | A1* | 5/2009 | Isshiki et al. | 369/44.23 |

FOREIGN PATENT DOCUMENTS

| CN | 1146593 A | 4/1997 |
|---|---|---|
| EP | 0612063 A1 | 8/1994 |
| KR | 10-0187795 B1 | 6/1999 |
| KR | 10-2004-0061203 A | 7/2003 |
| KR | 10-2004-0032679 A | 4/2004 |
| WO | WO-2005/114661 A1 | 12/2005 |

* cited by examiner

*Primary Examiner*—Paul Huber
(74) *Attorney, Agent, or Firm*—Birch, Stewart, Kolasch & Birch, LLP

(57) ABSTRACT

The present invention relates to a method and an apparatus of adjusting a focusing servo in an optical disc device. According to an embodiment of the present invention, a focusing servo is coarsely adjusted using a tracking error signal for a blank disc, data is recorded in a predetermined area of the disc, and then the focusing servo is finely adjusted using the characteristics of a reproduced signal for the recorded data. In this case, the focusing servo is adjusted to adjust a focusing position of an objective lens, and the predetermined area is a region provided on the disc to detect optimum recording power. The characteristics of the reproduced signal include magnitude and/or jitter value of the reproduced RF signal. Therefore, the present invention can optimally adjust a focusing servo even for a blank disc, and can improve data recording quality.

10 Claims, 2 Drawing Sheets

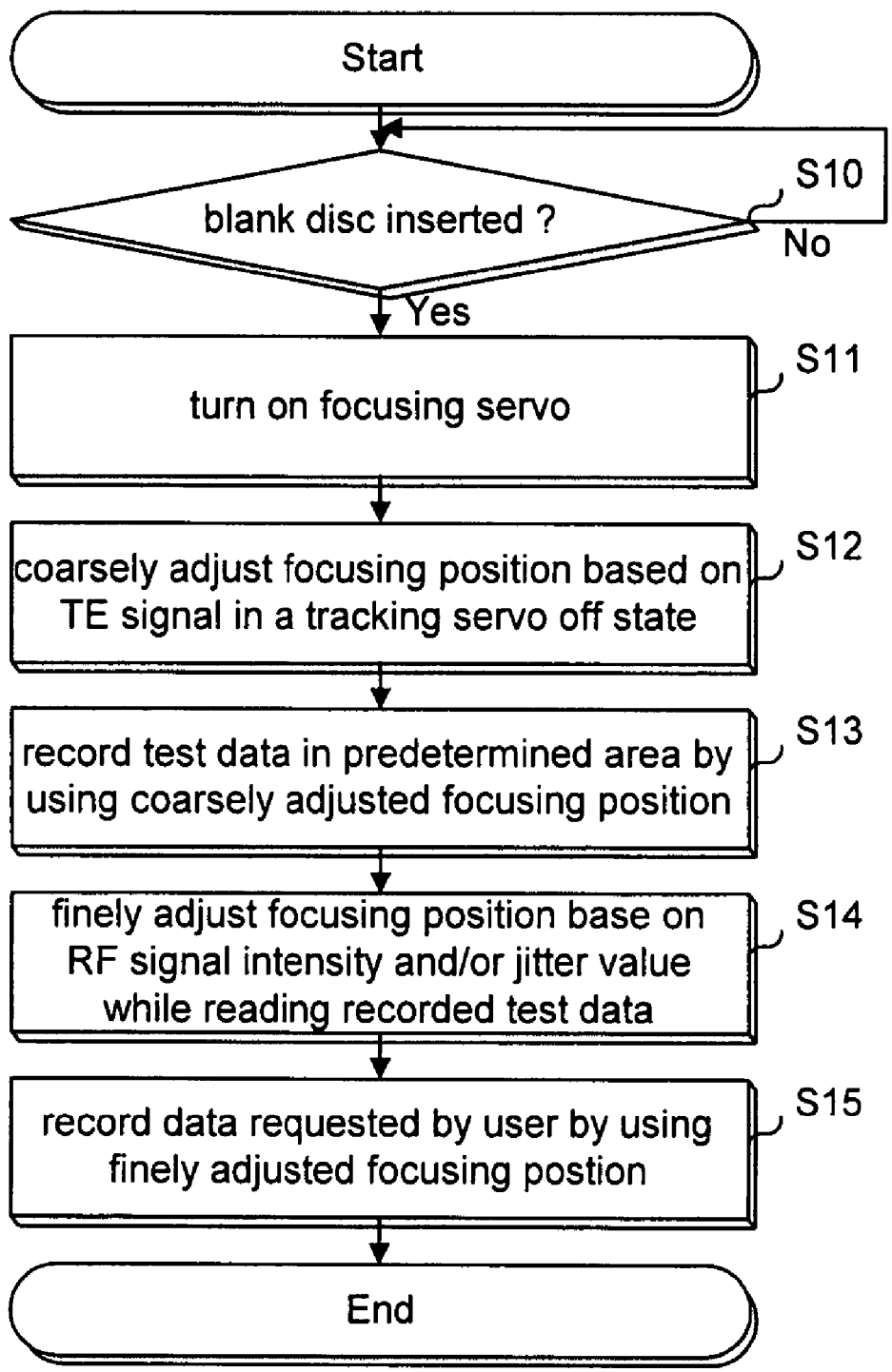

METHOD AND APPARATUS OF ADJUSTING FOCUSING SERVO IN OPTICAL DISC DEVICE

BACKGROUND OF THE INVENTION

1. Field of the Invention

The present invention relates, in general, to a method and an apparatus of adjusting a focusing servo in an optical disc device and, more particularly, to adjusting a focusing servo, which can adjust the focusing position for a blank disc, on which no data recorded.

2. Description of the Related Art

In order to reproduce or record data from or on an optical disc, the adjustment of various servos, such as a focusing servo and a tracking servo, is required. The focusing position varies with the state of a disc, the mechanism and the optical pickup, and greatly influences reproduction quality and, in particular, recording quality, and thus the adjustment of the focusing position is very important.

Further, recently, a dual-layer disc having two recording layers has been commercialized to increase the storage capacity. However, the dual-layer disc is disadvantageous in that the interval between the two recording layers is not wide, and reproduction and recording quality for the recording layer that is located far away from the surface of an optical disc is relatively deteriorated. Therefore, the necessity to precisely adjust the focusing position for a typical optical disc, as well as for the dual-layer disc, is further increased.

A conventional method of adjusting a focusing position is briefly described below.

First, in the case of a disc on which recorded data exists, a focusing position is adjusted using both a reproduced Radio Frequency (RF) signal, which is obtained from the recorded data, and a tracking error signal.

However, in the case of a blank disc on which no data is recorded, an RF signal cannot be used, and thus the focusing position is adjusted using only a tracking error signal.

Meanwhile, if data is recorded on the blank disc after the focusing position has been adjusted using a tracking error signal for the blank disc, an optical disc device detects an optimal focusing position using an RF signal and a tracking error signal, and stores the optimal focusing position in memory (Electrically Erasable Programmable Read Only Memory: EEPROM) as an optimal focusing position value for the blank disc. Subsequently, when a blank disc is inserted, the focusing position is adjusted using the stored focusing position value.

However, the adjustment of focusing position using only a tracking error signal is unreliable, and thus it is difficult to detect the optimal focusing position required for data recording. Further, when the focusing position value, which is detected and stored for an arbitrary blank disc, is applied to another blank disc, because there are variations between discs, it is difficult to optimally adjust the focusing position. If a focusing position is not optimally adjusted in this way, there is a problem in that the quality of recording on a blank disc is deteriorated.

SUMMARY OF THE INVENTION

Accordingly, the present invention has been made keeping in mind the above problems occurring in the prior art, and an object of the present invention is to provide a method of optimally adjusting a focusing servo for a blank disc.

In order to accomplish the above object, the present invention provides a method of adjusting a focusing servo in an optical disc device, comprising adjusting a focusing servo using a tracking error signal when a blank disc is inserted; recording data in a predetermined area of the disc; and readjusting the focusing servo based on characteristics of a reproduced signal for the recorded data.

The predetermined area may be an area provided on the blank disc to detect optimum recording power. Further, the tracking error signal used to adjust the focusing servo may be an error signal detected in a tracking servo off state. Further, the data recorded in the predetermined area may be test data or dummy data.

The characteristics of the reproduced signal may include a magnitude of a reproduced Radio Frequency (RF) signal and/or a jitter value of the reproduced RF signal. In this case, the jitter value may be calculated based on a bit error rate of data which is reconstructed from the reproduced RF signal. Further, different proportions may be considered between the magnitude of the reproduced RF signal and the jitter value of the reproduced RF signal when the focusing servo is adjusted.

The recording the data may comprise performing an optimum recording power detection operation in a test region on the disc; and recording test data in the test region using recording power which has been detected through the optimum recording power detection operation.

A target of the adjustment of the focusing servo may be a focusing position of an objective lens. In this case, information about the adjusted focusing position may be stored in the optical disc device in association with a disc code of the disc. Further, the information about the adjusted focusing position may be a voltage value which is applied to an actuator so as to move the objective lens to the focusing position.

In addition, the present invention provides an apparatus of adjusting a focusing servo, comprising optical unit configured to record data on a disc and read data from the disc; detection unit configured to detect a tracking error signal and an RF signal based on a signal read from the optical unit; servo unit configured to perform servo operations related to a data recording and a data reading; and control unit configured to control the optical unit and the servo unit to, when a blank disc is inserted, adjust a focusing servo using a tracking error signal detected from the detection unit, record data in a predetermined area of the disc, and to readjust the focusing servo based on characteristics of an RF signal for the recorded data.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a flowchart showing a method of adjusting a focusing servo in an optical disc device according to an embodiment of the present invention.

DETAILED DESCRIPTION OF PREFERRED EMBODIMENTS

Figure 1:
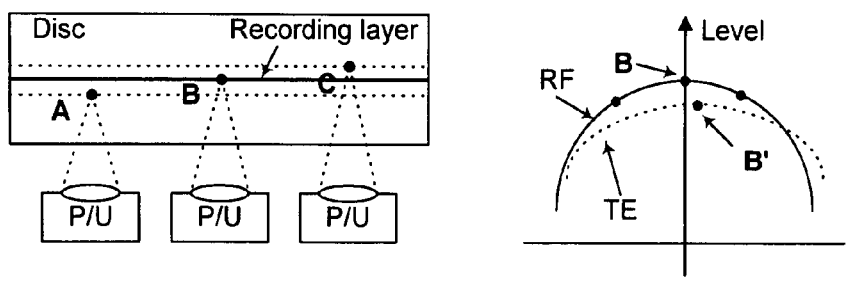
FIG. 1 illustrates the magnitudes of a tracking error signal and a reproduced RF signal according to the relative position of an objective lens and the recording layer of an optical disc.

Hereinafter, an embodiment of a method and an apparatus of adjusting a focusing servo in an optical disc device according to the present invention will be described in detail with reference to the attached drawings.

Reference now should be made to the drawings, in which the same reference numerals are used throughout the different drawings to designate the same or similar components.

FIG. 1 illustrates the magnitudes of a tracking error signal and a reproduced RF signal according to the relative position of an objective lens and the recording layer of an optical disc. The position B of the objective lens at which the reproduced RF signal has a maximum value, and the position B' of the objective lens at which the tracking error signal has a maximum value are not considerably different, but they may not exactly coincide each other, for several reasons.

In the case of a blank disc, since no data is recorded on the disc, and a reproduced RF signal cannot be obtained, the focusing position is adjusted using a tracking error signal. In the case of a disc on which data have been recorded, a focusing position is adjusted using a reproduced RF signal.

In the present invention, a focusing position is coarsely adjusted using a tracking error signal for a blank disc, and is finely adjusted using the characteristics of a reproduced RF signal for data which is recorded in a predetermined area of the disc through the recording of test data.

Figure 2:
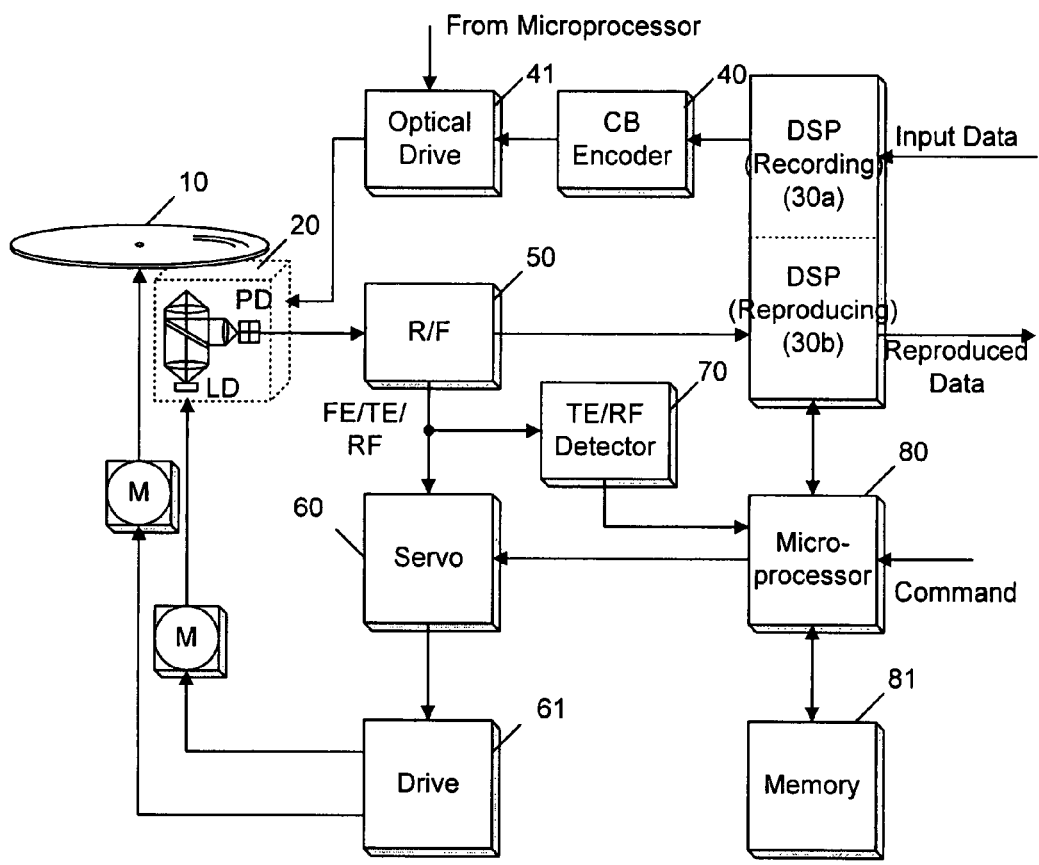
FIG. 2 is a block diagram showing the construction of an optical disc device, in which a method of adjusting a focusing servo is implemented according to an embodiment of the present invention.

FIG. 2 is a block diagram showing the construction of an optical disc device in which a method of adjusting a focusing servo is implemented according to an embodiment of the present invention.

The optical disc device includes an optical pickup 20, a digital recording signal processing unit 30a, a digital reproducing signal processing unit 30b, a channel bit encoder 40, an optical drive 41, a Radio Frequency (RF) unit 50, a servo unit 60, a drive unit 61, a Tracking Error (TE)/RF detection unit 70, a microprocessor 80, and memory 81.

The digital recording signal processing unit 30a adds an Error Correction Code (ECC), etc. to input digital data, and then converts the input digital data into a recording format. The channel bit encoder 40 re-converts the data, which has been converted into the recording format, into a bit stream. The optical drive 41 outputs an optical drive signal corresponding to an input signal, and the optical pickup 20 records data on the optical disc 10 in response to the optical drive signal, and reads data from the recording layer of the optical disc 10.

The RF unit 50 generates a focusing error signal, a tracking error signal, and an RF signal, using the signal read by the optical pickup 20, performs filtering and waveform-shaping on the RF signal, and outputs the filtered and waveform-shaped RF signal as a binary signal. The digital reproducing signal processing unit 30b reproduces original data from the binary signal using its own clock signal, which is phase-locked with the binary signal, and then outputs the reproduced original data.

The drive unit 61 drives a spindle motor for rotating the optical disc 10, and a sled motor for moving the optical pickup 20. The servo unit 60 controls the driving of the drive unit 61 using the tracking error signal TE, the focusing error signal FE, and the rotating speed of the optical disc 10. The TE/RF detection unit 70 detects the magnitudes of the tracking error signal and the RF signal, which are output from the RF unit 50. The memory 81 stores therein various types of control data required to reproduce or record data from or on the optical disc 10.

The microprocessor 80 controls various servos, such as a focusing servo or tracking servo, for the inserted optical disc 10. When the focusing position of the objective lens provided in the optical pickup 20 is adjusted in association with the adjustment of the focusing servo, the focusing position is coarsely adjusted on the basis of the detected intensity of the tracking error signal, test data is recorded in a specific area of the optical disc 10, and the focusing position is finely adjusted based on the characteristics of the reproduced RF signal for the recorded data, in the case of a blank disc.

In the above construction, the memory 81 is implemented using a non-volatile memory device, such as Electrically Erasable Programmable Read Only Memory (EEPROM), and stores reference recording power and a reference beta value β for each disc code (each disc production company).

FIG. 3 is a flowchart showing a method of adjusting a focusing servo in an optical disc device according to an embodiment of the present invention. Hereinafter, with reference to the construction of FIG. 2, the method of adjusting a focusing servo in FIG. 3 according to the present invention is described in detail.

If the optical disc 10 is inserted, the microprocessor 80 determines whether the optical disc 10 is a blank disc. For this operation, the microprocessor 80 moves the optical pickup 20 to a predetermined area of the optical disc 10, and determines whether the optical disc 10 is a blank disc depending on whether data has been recorded in the predetermined area.

In this case, the predetermined area is a test region, which can be a Recording Management Area (RMA) or a lead-in area when the optical disc 10 is a Digital Versatile Disc (DVD), and can be a Program Memory Area (PMA) when the optical disc 10 is a Compact Disc (CD).

If it is determined that the optical disc 10 is a blank disc at step S10, the microprocessor 80 turns on the focusing servo at step S11, and coarsely adjusts the focusing position of the objective lens for the optical disc 10 on the basis of the tracking error signal, detected by the TE/RF detection unit 70 in a focusing servo On/tracking servo Off state, at step S12.

After the focusing position of the objective lens has been coarsely adjusted, the microprocessor 80 performs an Optimum Power Control (OPC) operation in the test region on the optical disc 10, thus detecting optimum recording power. The OPC operation is described in brief below.

First, the microprocessor 80 reads reference recording power corresponding to the disc code of the optical disc 10 from the memory 81, and records test data in the predetermined test region on the optical disc 10, for example, the test region in a Power Calibration Area (PCA), while varying recording power in predetermined increments on the basis of the read reference recording power.

After the recording of test data has been completed, the microprocessor 80 sequentially reads the recorded test data, and detects beta values β in the reproduced RF signal. Further, the microprocessor 80 obtains a function from the detected beta values and respective recording power corresponding to the beta values, and compares the reference beta value, stored in the memory 80 to correspond to the disc code of the optical disc 10, with the function, thus detecting optimal recording power.

When the optimum recording power of the optical disc 10 has been detected in this way, the microprocessor 80 records predetermined data again in a specific area of the optical disc 10 (for example, the test region) in a focusing servo On/tracking servo On state. In this case, the microprocessor 80 records the predetermined data using the detected optimum recording power at step S13. The predetermined recorded data may be test data or dummy data.

When the recording of the predetermined data has been completed, the microprocessor 80 detects the magnitude of the reproduced RF signal, output from the RF unit 50, and the jitter value of the reproduced RF signal while reading the recorded data, and thus finely adjusts the focusing position of the objective lens on the basis of the detected magnitude of the RF signal and/or the jitter value at step S14. The jitter value of the reproduced RF signal can be obtained from a Bit Error Rate (BER) of the data reconstructed from the reproduced signal, which is read from the disc.

In this case, the microprocessor 80 finely adjusts the focusing position so that the magnitude of the reproduced RF signal is increased and the jitter value is minimized. Further, the microprocessor 80 can adjust the focusing position while considering the magnitude of the RF signal and the jitter value in different proportions depending on circumstances. For example, the ratio of the weight of the magnitude of the reproduced RF signal to the weight of the jitter value can be set to 5:5 or 6:4.

Thereafter, the microprocessor 80 records data, requested by a user, using the focusing servo in which the focusing position is finely adjusted at step S15.

Meanwhile, the microprocessor 80 can store information about the finely adjusted focusing position in the memory 81 in association with the disc code of the optical disc 10. The information about the focusing position can be a voltage value which is applied to an actuator to move the objective lens to a corresponding position. In this case, the microprocessor 80 can immediately optimally adjust a focusing position using the value stored in the memory 81 if a blank disc having the same disc code is inserted later.

As described above, the present invention can optimally adjust a focusing position using a highly reliable reproduced RF signal even for a blank disc.

Accordingly, the present invention is advantageous in that it can be used to optimally adjust a focusing servo even for a blank disc, and can improve data recording quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of adjusting a focusing servo in an optical disc device, comprising:
   adjusting a focusing servo using a tracking error signal detected in a tracking servo off state when a blank disc is inserted;
   recording data in a power calibration area (PCA) of the disc;
   readjusting the focusing servo based on characteristics of a reproduced signal for the recorded data; and
   readjusting the focusing servo so that the magnitude of the reproduced radio frequency signal is increased and a jitter value is minimized, wherein a focusing position of a target is adjusted using the readjusted focusing servo, and the adjusted focusing position is stored in association with a disc code of the disc.

2. The method according to claim 1, wherein the PCA is an area provided on the blank disc to detect optimum recording power.

3. The method according to claim 1, wherein the data recorded in the PCA is test data or dummy data.

4. The method according to claim 1, wherein the characteristics of the reproduced signal include a magnitude of a reproduced Radio Frequency (RF) signal and/or a jitter value of the reproduced RF signal.

5. The method according to claim 4, wherein the jitter value is calculated based on a bit error rate of data which is reconstructed from the reproduced RF signal.

6. The method according to claim 4, wherein different proportions are considered between the magnitude of the reproduced RF signal and the jitter value of the reproduced RF signal when the focusing servo is adjusted.

7. The method according to claim 1, wherein the recording the data comprises:
   performing an optimum recording power detection operation in a test region on the disc; and
   recording test data in the test region using recording power which has been detected through the optimum recording power detection operation.

8. The method according to claim 1, wherein the target of the adjustment of the focusing servo is a focusing position of an objective lens.

9. The method according to claim 8, wherein the adjusted focusing position is stored as a voltage value which is applied to an actuator so as to move the objective lens to the focusing position.

10. An apparatus of adjusting a focusing servo, comprising:
   an optical unit configured to record data on a disc and read data from the disc;
   a detection unit configured to detect a tracking error signal and an RF signal based on a signal read from the optical unit;
   a servo unit configured to perform servo operations related to a data recording and a data reading; and
   a control unit configured to control the optical unit and the servo unit to, when a blank disc is inserted, adjust a focusing servo using a tracking error signal detected from the detection unit in a tracking servo off state, record data in a power calibration area of the disc, to readjust the focusing servo based on a magnitude of a reproduced radio frequency signal for the recorded data and readjust the focusing servo so that the magnitude of the reproduced radio frequency signal is increased and a jitter value is minimized, wherein a focusing position of a target is adjusted using the readjusted focusing servo, and the adjusted focusing position is stored in association with a disc code of the disc.

* * * * *